United States Patent
Suzuki (10) Patent No.: US 6,208,449 B1
(45) Date of Patent: Mar. 27, 2001

(54) IMAGE FORMING DEVICE

(75) Inventor: Takayoshi Suzuki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/267,643

(22) Filed: Mar. 15, 1999

(30) Foreign Application Priority Data

Mar. 19, 1998 (JP) .................................................. 10-069891

(51) Int. Cl.[7] .............................. G02B 26/08; B41J 2/435
(52) U.S. Cl. .......................... 359/196; 347/236; 347/237; 347/246; 347/249; 347/235
(58) Field of Search .......................... 359/196; 347/236, 347/246, 249, 235, 237; 358/448

(56) References Cited

U.S. PATENT DOCUMENTS 4,583,128 * 4/1986 Anderson, Jr. et al. ............. 358/302
5,666,213 * 9/1997 Ohshita et al. ...................... 358/448

* cited by examiner

*Primary Examiner*—Audrey Chang
*Assistant Examiner*—Jennifer Winstedt
(74) *Attorney, Agent, or Firm*—Finnegan, Henderson, Farabow, Garrett & Dunner, L.L.P.

(57) ABSTRACT

The magnification of an image in the main scanning direction thereof is altered by making the frequency of the image clock variable. At this time, if the pre-SOS lighting signal and the APC signal are output synchronously with the frequency of the image clock, then an SOS signal may not be output from the SOS sensor and control of the amount of light of a light beam may not be accurately executed. Therefore, the timings of the outputs of the pre-SOS lighting signal and the APC signal are controlled so as to normally be output at a uniform timing (i.e. the periods from the input of the SOS signal until the outputs of each signal are made uniform).

8 Claims, 12 Drawing Sheets

IMAGE FORMING DEVICE

BACKGROUND OF THE INVENTION

1. Field of the Invention

The present invention relates to an image forming device and particularly to an image forming device which can alter the magnification of an image in the main scanning line by making the frequency of an image clock variable.

2. Description of the Related Art

Figure 8:
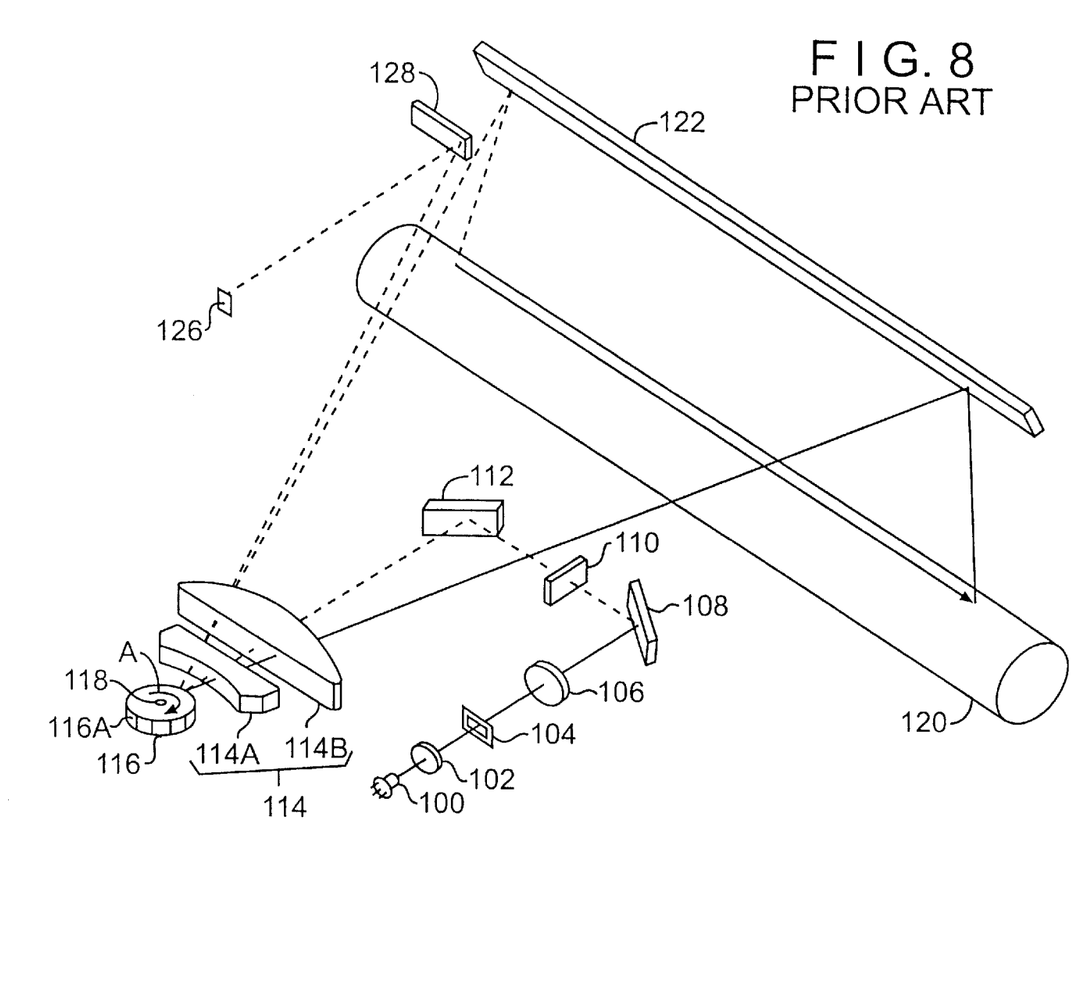
FIG. 8 is a schematic perspective view showing the schematic structure of a photo-scanning device.

Conventionally, image forming devices are constructed so as to include a photo-scanning device and the like for scanning a light beam emitted from a light source onto a photoreceptor. Both overfield types and underfield types of photo-scanning device exist. In the overfield type of photo-scanning device, as is shown in FIG. 8, a laser beam emitted from a laser diode 100 serving as a light source is changed into parallel light by a collimator lens 102 and then reshaped by a slit 104. It is then guided to a polygon mirror 116 after being transmitted through an expander lens 106, a reflecting mirror 108, a cylinder lens 110, a reflecting mirror 112, and an fθ lens 114 comprising a first lens 114A and a second lens 114B.

The polygon mirror 116 is a regular prism, having a plurality of reflective surfaces 116A on the side surface thereof, which rotates at high speed in the direction of the arrow A around the axis of rotation 118A. Accordingly, the angle of incidence of the light beam on each of the reflective surfaces 116A is continually changing and being deflected. The beam width in the scanning direction of the light beam incident on the polygon mirror 116, with which the overfield type of photo-scanning device is equipped, is substantially wider than the width of the reflecting surfaces 116A of the polygon mirror 116. Therefore, the polygon mirror 116 scans the incident light beam so as to cut it, converts the scanning speeds by the fθ lens 114 so as to become uniform, and forms an image on the photoreceptor 120 in the main scanning direction. An image is further formed on the photoreceptor 120 in the sub-scanning direction by a cylinder mirror 122 or a cylinder lens.

Moreover, a start of scan sensor 126 and a reflecting mirror 128 are disposed in the vicinity of the start of main scan position of the photoreceptor 120. A start of scan signal is output by a light beam striking the start of scan sensor 126.

Figure 9A:
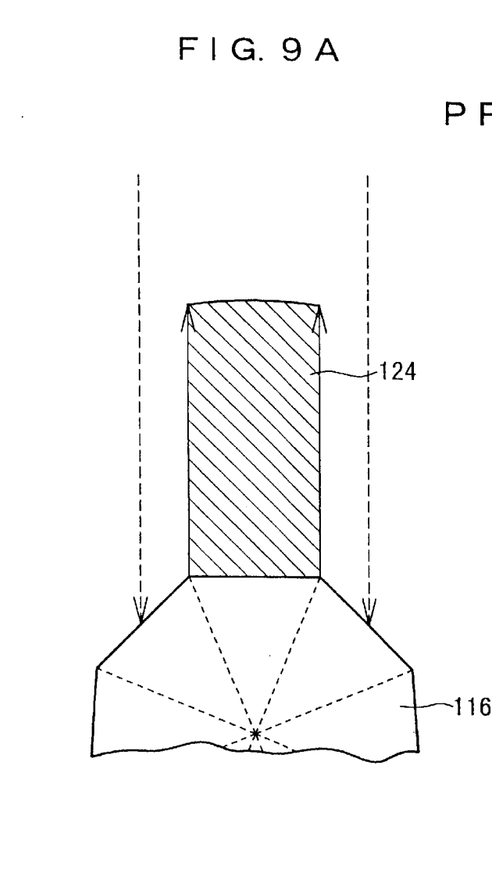
FIGS. 9A and 9B are schematic diagrams showing states of an incident light beam in an overfield type of photo-scanning device.
Figure 9B:
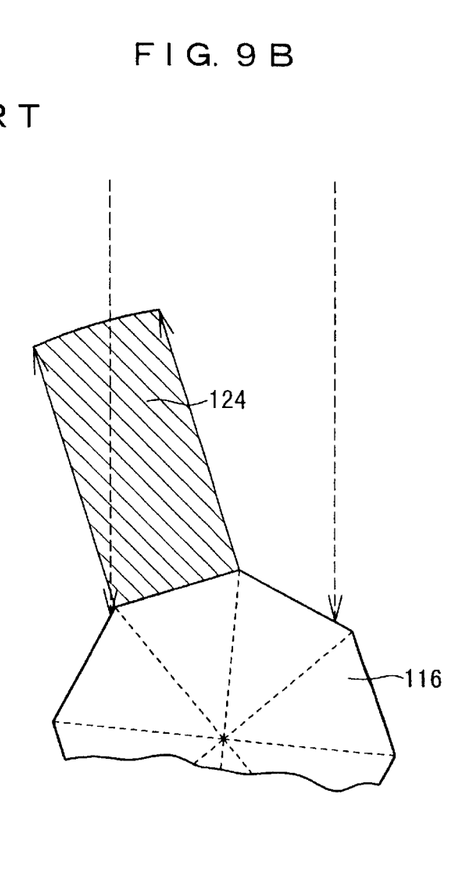

States when a light beam 124 is incident on the polygon mirror 116 of the overfield type of photo-scanning device are shown in FIG. 9A and FIG. 9B. FIG. 9A shows the state when the central area of the image to be scanned is being scanned, while FIG. 9B shows the state when edge potions of the area of the image to be scanned or portions outside the area of the image to be scanned are being scanned. Normally, the light beam incident on the polygon mirror 116 is a laser beam oscillating in side single mode and having a Gaussian type of configuration. Because of this, the light beam incident on the polygon mirror 116 is scanned so as to cut out a portion of it and the beam diameter and amount of light vary somewhat because of variations and so on in the width of the incident luminous flux due to the deflections of the polygon mirror 116.

Figures 10A, 10B:
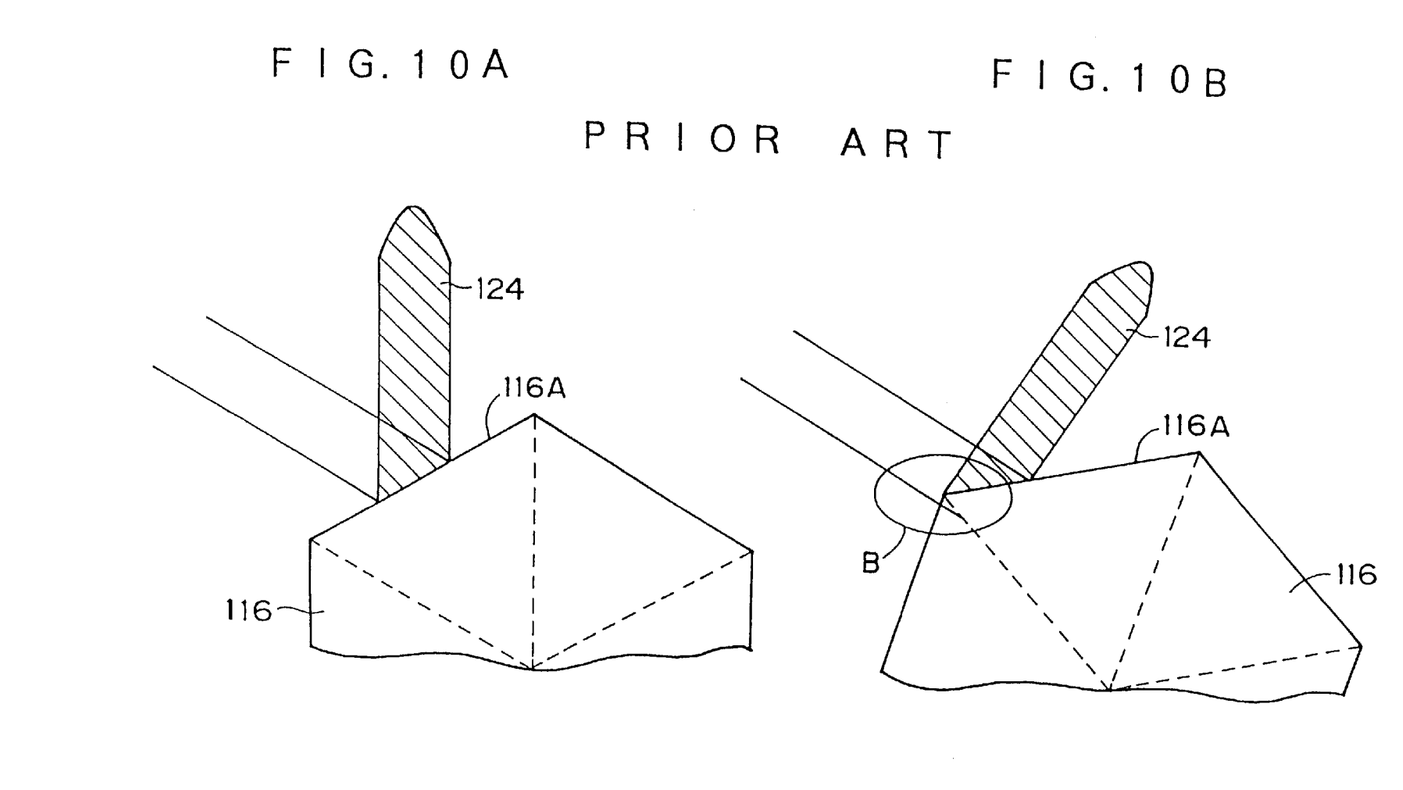
FIGS. 10A and 10B are schematic diagrams showing states of an incident light beam in an underfield type of photo-scanning device.

In contrast, as is shown in FIGS. 10A and 10B, in an underfield type of photo-scanning device, when the angle of deflection is large, an eclipse (the area B within the solid line in FIG. 10B) is generated in the light beam incident on the reflecting surfaces 116A of the polygon mirror 116. This causes abrupt variations in the amount of light of the light beam 124.

In contrast to this, in the aforementioned overfield type of photo-scanning device, the amount of light and so on of the light beam 124 does vary somewhat, but not abruptly. This enables the ratio between the scannable width and the width of the image area, in other words, the effective scanning ratio to be made sufficiently large.

However, if the effective scanning ratio is increased, then it may not be possible to secure sufficient time for carrying out processes such as controlling the amount of light from the laser diode 100 (Auto Power Control—APC), which conventionally are executed outside the image area. In particular, in an image forming device which is able to alter the magnification of the image in the main scanning direction by making the frequency of the image clock variable, the effective scanning ratio changes in accordance with frequency of the image clock. It should be noted that, if the magnification of the image in the main scanning direction is reduced, the frequency of the image clock is increased, while if the magnification of the image in the main scanning direction is increased, the frequency of the image clock is reduced.

An explanation will be given below of the changes in the effective scanning ratio in accordance with the frequency of the image clock with reference to the timing charts shown in FIGS. 11A and 11B.

Figure 11A:
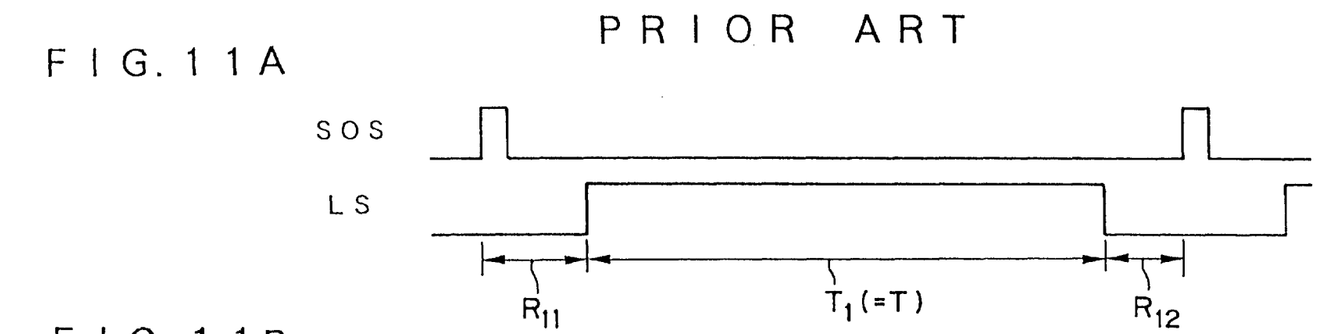
FIG. 11A is a timing chart showing the timings of the output of an SOS signal and an LS signal when the frequency of an image clock is high.
Figure 11B:
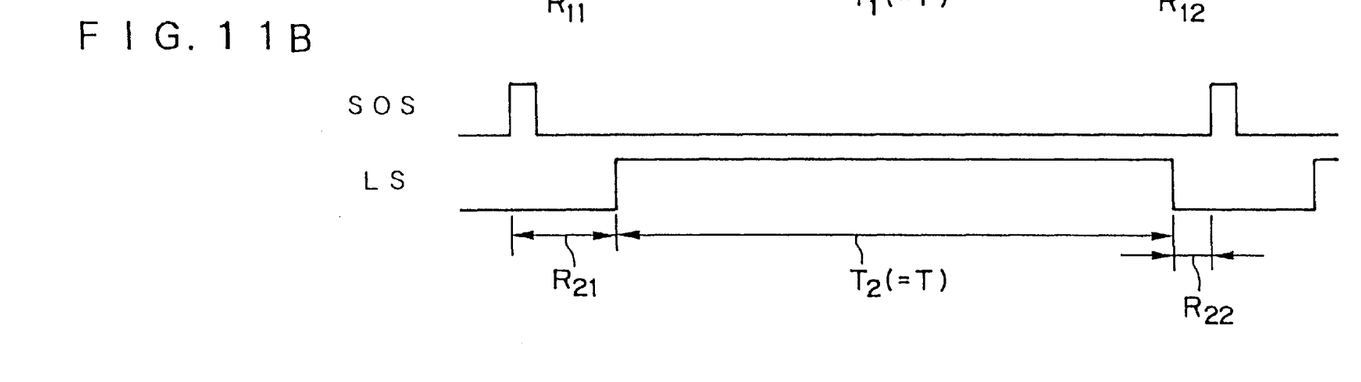
FIG. 11B is a timing chart showing the timings of the output of an SOS signal and an LS signal when the frequency of an image clock is low.

FIG. 11A shows the timing when a start of scan signal (hereinafter abbreviated to SOS signal) output from a start of scan sensor 126 (hereinafter abbreviated to SOS sensor) is output, and the timing when a signal which allows data output in the image area, in other words, an image signal (hereinafter abbreviated to LS (line sync) signal) is output, when the frequency of the image clock is high. FIG. 11B shows the timings of the outputs of the SOS signal and the LS signal when the frequency of the image clock is low.

At this time, the time T to scan the image area of a fixed number of pixels is shortened when the frequency of the image clock is high ($T_1<T_2$). The output cycle of the SOS signal is determined by the number of rotations of an unillustrated polygon motor which instructs the rotation of the polygon mirror 116. Normally, the polygon motor rotates at a constant speed so that the output cycle of the SOS signal is constant. Accordingly, the time outside the image area R is short when the frequency of the image clock is low ($R_{11}+R_{12}>R_{21}+R_{22}$), and as the frequency of the image clock becomes lower, the time R outside the image area becomes shorter.

Figure 12A:
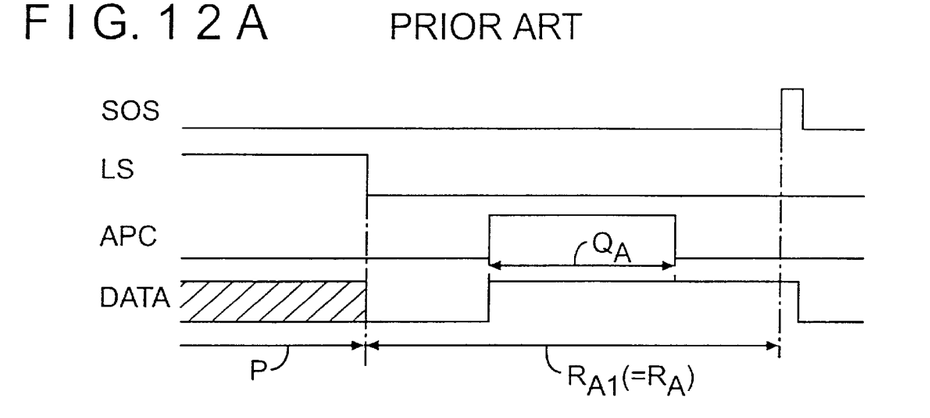
FIG. 12A is a timing chart showing the timings of the output of the respective signals in a nominal state.
Figure 12B:
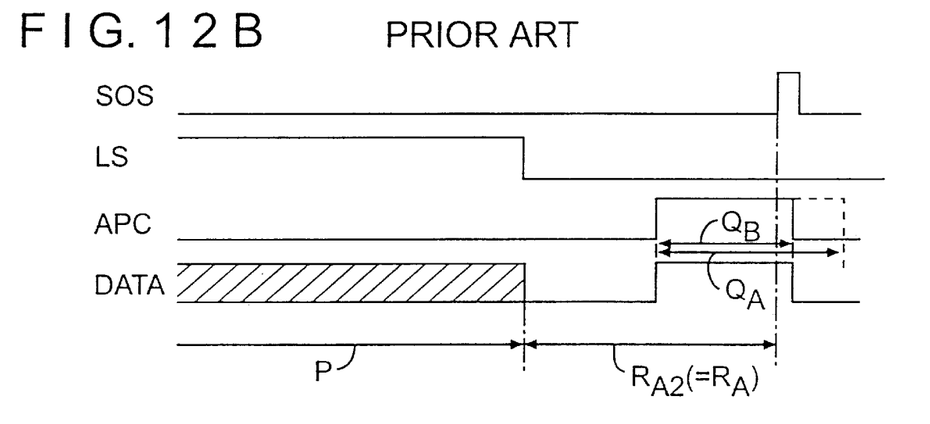
FIG. 12B is a timing chart showing the timings of the output of the respective signals when the frequency of the image clock low.
Figure 12C:
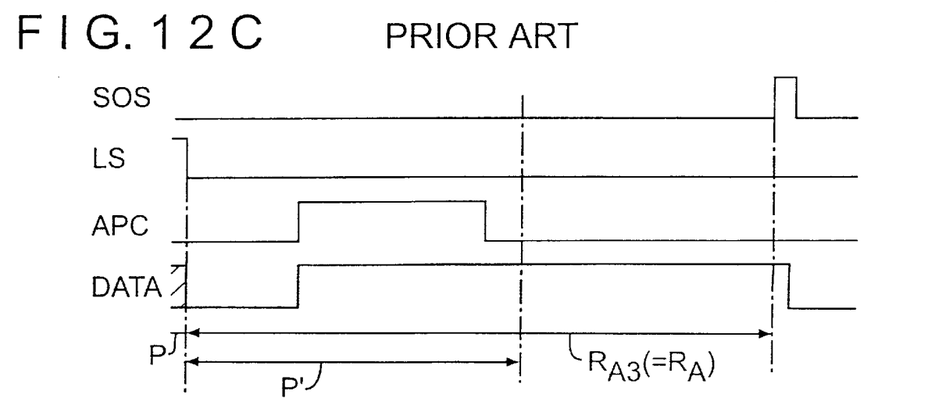
FIG. 12C is a timing chart showing the timings of the output of the respective signals when the frequency of the image clock is high.

FIGS. 12A through 12C show timing charts from the vicinity of the end of the image area until the next SOS signal is output from the SOS sensor 126. FIG. 12A is a timing chart when the image magnification is not altered (nominal state). FIG. 12B is a timing chart when the frequency of the image clock has been lowered in order to increase the image magnification. FIG. 12C is a timing chart when the frequency of the image clock has been raised in order to decrease the image magnification. Note that APC represents a signal instructing control of the amount of light. This signal instructs the execution of auto power control which controls the amount of light from the laser diode 100 serving as the light source. DATA represents a light instructing signal which contains the image data input to the laser diode 100. The portions indicated by the diagonal lines in FIGS. 12A through 12C correspond to the image data input to the laser diode 100.

As is shown in FIG. 12B, when the frequency of the image clock is lowered in order to increase the magnification of the image in the main scanning direction, the ratio of the image area P to the interval between SOS signal outputs, namely the effective scanning ratio, is increased. Therefore, the time $R_A$ from the end of the output of the signal corresponding to the image area P (the image signal) until the next SOS signal is output (namely, the time outside the image area) is shortened ($R_{A1} > R_{A2}$). Therefore, the time $Q_A$ necessary to execute control of the amount of light from the laser diode 100 cannot be secured, and the control of the amount of light becomes inaccurate. In some cases, when the amount of light from the laser diode is reduced, the SOS signal cannot be output from the SOS sensor 126.

Further, as is shown in FIG. 12C, when the frequency of the image clock is increased in order to lower the magnification of the image in the main scanning direction, the effective scanning ratio is reduced. Therefore, the time $R_A$ from the end of the output of the signal corresponding to the image area P (the image signal) until the next SOS signal is output is lengthened ($R_{A1} < R_{A3}$). In this case, the times of the forced light for executing control of the amount of light from the laser diode 100 and of the forced light for outputting the SOS signal from the SOS sensor 126 are lengthened, and control of the amount of light is executed in the area corresponding to the image area P when the frequency of the image dock is low (see FIG. 12B). Normally, the inside of a photo-scanning device is light-shielded in order to prevent light from the forced light area which is unrelated to the image from causing turbidity in the image as stray light. However, in an area P', which has the possibility of being an image area, it is not possible to execute light-shielding measures. As a result, unforeseen reflections and the like occur in the photo-scanning device which then generate stray light.

SUMMARY OF THE INVENTION

The present invention was made in order to solve the aforementioned problems and the objective thereof is to provide an image forming device capable of executing accurate control and the like of the amount of light of a light beam even when the frequency of an image clock has been made variable in order to alter the magnification of an image in the main scanning direction.

In order to achieve the above-described objective, the first aspect of the present invention is an image forming device capable of altering the magnification of an image in the main scanning direction by making the frequency of the image clock variable, comprising a first output means which outputs a lighting instructing signal for instructing that a light beam emitted from a light source be turned on, on the basis of the main scanning signals output for each main scanning, a second output means for outputting a light amount control instructing signal for instructing that control of the amount of light of a light beam be executed, on the basis of the main scanning signals output for each main scanning, and a control means for controlling the first output means and the second output means so that the periods from the output of the main scanning signal until the outputs of the lighting instructing signal and the light amount control instructing signal become uniform regardless of changes in the frequency of the image clock.

The image forming device outputs an image signal corresponding to the image area of the scanned image, a lighting instructing signal for instructing the lighting of a light beam output from a light source, and a light amount control instructing signal for instructing the execution of control of the amount of light of the light beam. The timings of the outputs of each signal are altered so as to be synchronous with the image clock by making the frequency of the image clock variable in order to alter the magnification of the image in the main scanning direction. When the magnification of the image in the main scanning direction is increased, the frequency of the image clock is reduced. When the magnification of the image in the main scanning direction is reduced, the frequency of the image clock is increased. However, the timings of the outputs of the lighting instructing signal and the light amount control signal sometimes deviate from the previously determined timings, causing the control of the amount of light and so on to be inaccurately executed and affecting the image formed.

Therefore, the image forming device according to the first aspect of the present invention comprises a control means for controlling the first output means and the second output means so that the periods from the output of the main scanning signal until the outputs of the lighting instructing signal and the light amount control instructing signal become uniform regardless of changes in the frequency of the image clock.

According to the second aspect of the present invention, the control means controls the first output control means and the second output control means on the basis of a value expressing a change in the magnification of an image in the main scanning direction.

According to the third aspect of the present invention, the lighting instructing signal and the light amount control instructing signal are output on the basis of the image clock from the time of the output of the main scanning signal or on the basis of the output count value of the image signal output synchronously with the image clock, and the control means alters the output count value so that the output count value changes conversely by the same amounts as the changes in the timings of the outputs of the lighting instructing signal and the light amount control instructing signal which changed in accordance with changes in the frequency of the image clock.

Accordingly, the periods from the output of the main scanning signal until the outputs of the lighting instructing signal and the light amount control instructing signal become uniform regardless of changes in the frequency of the image clock. Accordingly, control of the amount of light of the light beam and so on can be accurately executed.

However, the timing of the end of image formation in a main scanning sometimes occurs in the vicinity of the end of the timing of the output of the light amount control instructing signal or the start of the timing of the output of the light amount control instructing signal. In this case, accurate control of the amount of light of the light beam cannot be executed.

Therefore, according to the fourth aspect of the present invention, there is provided a further detecting means for detecting, prior to main scanning, the passage of a light beam emitted from a light source, wherein the control means controls the second output means so that, when the timing of the end of image formation in a single main scanning is in the vicinity of the end of the timing of the output of the light amount control instructing signal or the start of the timing of the output of the light amount control instructing signal, the light amount control instructing signal is output directly after the passage of a light beam is detected by the detecting means.

Accordingly, because the time necessary for control of the amount of light of a light beam can be normally secured, the control of the amount of light can be accurately executed.

DESCRIPTION OF THE PREFERRED EMBODIMENTS

Figure 1:
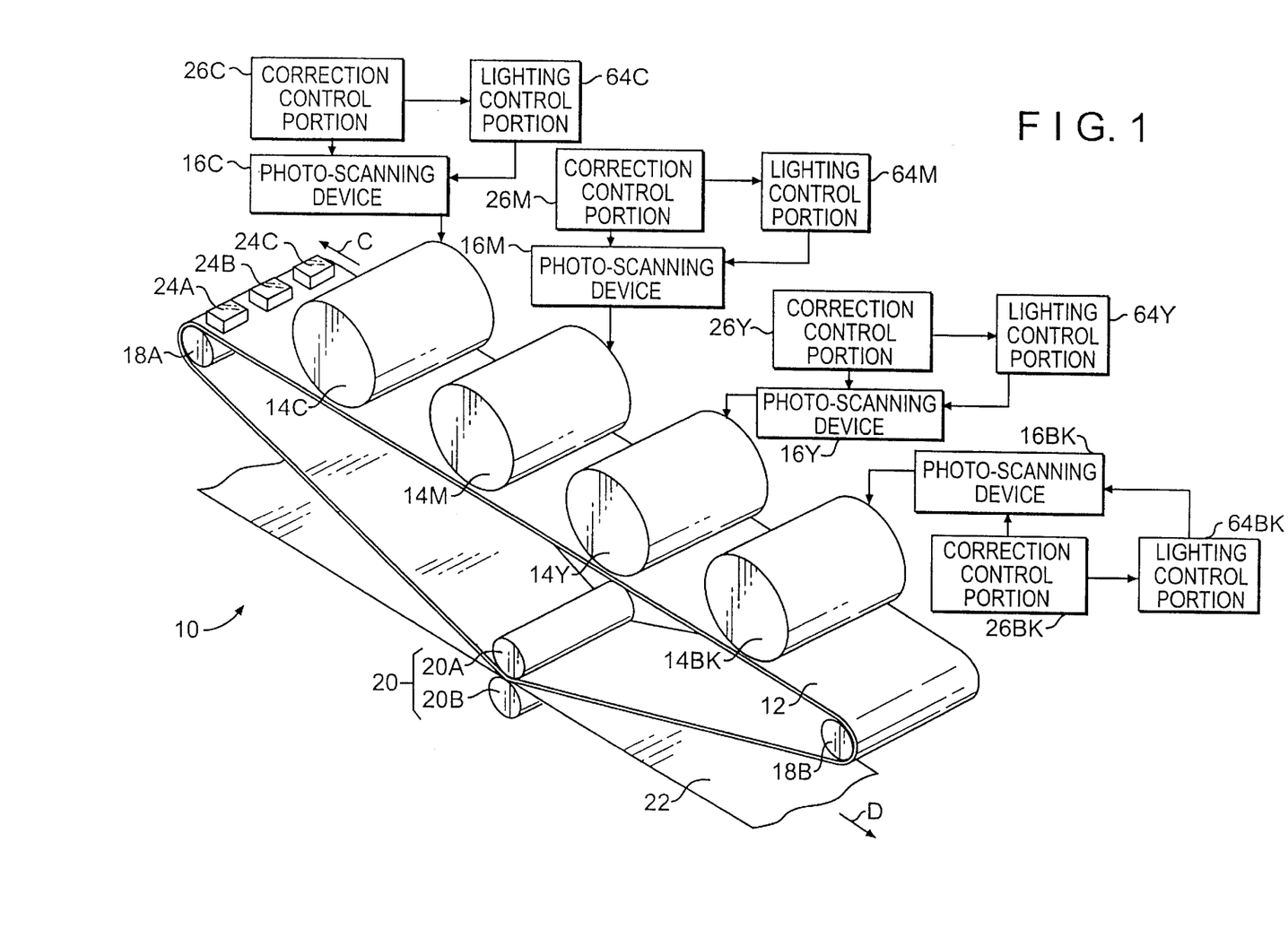
FIG. 1 is a schematic structural diagram of the image forming device of the present embodiment.

The image forming device 10 of the present embodiment is shown in FIG. 1.

As is shown in FIG. 1, in the image forming device 10, a plurality of drum-shaped photoreceptors 14 are disposed along the lengthwise direction of a transfer belt 12. The image forming device 10 of the present embodiment forms color images and, therefore, is equipped with photoreceptors 14 for each of the four colors cyan, magenta, yellow, and black. Note that members which have been disposed to correspond to each color in the photoreceptor, photo-scanning device, and the like will have the letters C, M, Y, and BK added to the appropriate symbol only when it is necessary to discriminate therebetween.

Surrounding the photoreceptors 14 are disposed an unillustrated electrifier, developer, first transferring machine, cleaner, and so on. In addition, there are disposed photo-scanning devices 16 (see FIG. 8) each constructed from a laser diode 100, a collimator lens 102, a polygon mirror 116, and an fθ lens 114. When light beams emitted from the laser diode 100 are irradiated by the action of the photo-scanning devices 16 onto the photoreceptors 14 which have been electrified by the electrifier, latent images corresponding to the object image are formed on the outer surfaces of the photoreceptors 14. Note that image scanning by a light beam emitted from the laser diode 100 is started via a predetermined timing after the passing of the light beam has been detected by the SOS sensor (start of scan sensor) 126 disposed in the photo-scanning device 16 and an SOS signal (start of scan signal) has been output. The latent images formed on the outer surfaces of the photoreceptors 14 are developed in the toners for the respective colors by developers disposed around the photoreceptors 14. Namely, toner images are formed on the outer surfaces of the photoreceptors 14. The developers are loaded with cyan, magenta, yellow, and black toners corresponding to each of the photoreceptors 14C, 14M, 14Y, and 14BK.

The toner images formed on the outer surfaces of the photoreceptors 14 are transferred onto the transfer belt 12 by the first transferring machine. The transfer belt 12 is rotatable in a predetermined direction (the direction indicated by the arrow C in FIG. 1) by the transporting rollers 18A and 18B and by one of the rollers 20A forming a second transferring machine 20. Toner images formed on the outer surfaces of each of the photoreceptors 14C, 14M, 14Y, and 14BK are transferred in sequence onto the surface of this transfer belt 12. Namely, toner images in the four colors of cyan, magenta, yellow, and black are transferred in layers onto the transfer belt 12. Note that in the present embodiment, the toner image transferred in this way by superposing the toner images in four colors is called the final toner image.

Toner remaining on the outer surfaces of the of the photoreceptors 14 after the completion of the transfer of the toner image onto the transfer belt 12 is removed by an unillustrated cleaner and the photoreceptors 14 are de-electrified by a de-electrification lamp.

A second transferring machine 20 is positioned on the opposite side of the transfer belt 12 to the side at which the photoreceptors 14 are disposed. The second transferring machine 20 is formed from two rollers 20A and 20B facing each other. The second transferring machine 20 transfers the final toner image, that has been transferred onto the transfer belt 12, onto paper 22 extracted from an unillustrated paper tray and transported in the direction of the arrow D in FIG. 1. The final toner image which has been transferred onto the paper 22 is fixed thereon by an unillustrated fixing machine. Accordingly, the desired image can be formed on the paper 22.

Image position detection sensors 24A, 24B, and 24C are disposed in the widthwise direction of the transfer belt 12 on the downstream side in the direction in which the transfer belt 12 travels from the position where the photoreceptors 14 are disposed. The area across the width of the transfer belt 12 corresponds to the image scannable area on the photoreceptors 14 so that the dimension of the photoreceptors 14 in the lengthwise direction is identical to the dimension of the transfer belt 12 in the widthwise direction. The image position detection sensors 24A, 24B, and 24C detect the position of the final toner image transferred onto the transfer belt 12.

Correction control portions 26 and lighting control portions 64 are connected to the photo-scanning devices 16 for irradiating light beams onto the photoreceptors 14. In the same way as the photo-scanning devices 14, a correction control portion 26 and a lighting control portion 64 is provided for each of the photoreceptors 14. The correction control portions execute correction of the control of the timing of the lighting (turning on) of the laser diodes 100 provided inside the photo-scanning devices 16, correction of the setting of the number of steps of the skew motor 28 for correcting the skew in the direction of rotation of the photoreceptor 14, and correction of the phase settings and the like of the polygon motor 30 for instructing the driving of the polygon mirror (see FIG. 2). The lighting control portions 64 control the lighting of the laser diodes 100, namely, the emission of the light beams from the laser diodes 100, provided in the photo-scanning devices 16 (explained in detail below, see FIG. 4).

Figure 2:
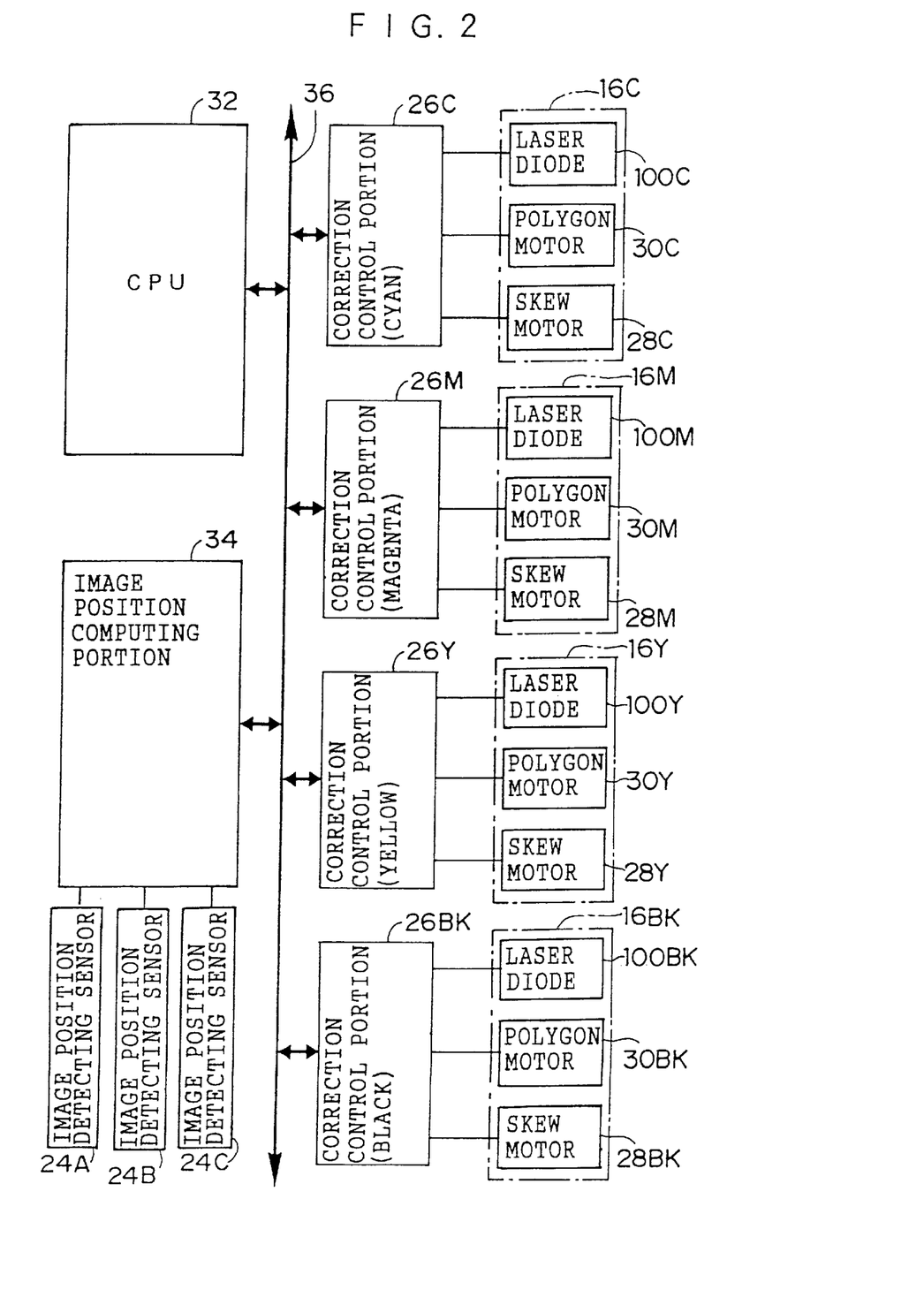
FIG. 2 is a schematic block diagram showing the structure around the correction control portion of the image forming device.

As is shown in FIG. 2, the correction control portions 26 are connected by a bus 36 with the CPU 32 and the image position computing portion 34. The image position computing portion 34 is connected to the aforementioned image position detecting sensors 24A, 24B, and 24C. The image position computing portion 34 computes the image position information for each color on the basis of the results of the position detection of the final toner image on the transfer belt 12 detected by the image position detection sensors 24A, 24B, and 24C. In the present embodiment, toner images in the four colors are transferred respectively on the different photoreceptors 14C, 14M, 14Y, and 14BK and are transferred in succession onto a single transfer belt 12, therefore, the magnification in the main scanning direction of the toner images in each of the colors may be different due to the influence of the mounting position and the like. Namely, the image position information for each of the colors computed by the image position computing portion 34 may differ depending on the toner image for each color and, therefore, this difference is corrected.

The CPU 32 computes the target value of the correction on the basis of the image position information for each color computed by the image position computing portion 34. The target values are magnifications which are obtained on the basis of Formula (1) shown below.

Formula 1.

Magnification after alteration (target value)=magnification before alteration×(100−the magnification to be changed)/100  (1)

(wherein the magnification to be changed is expressed as a percentage which has a plus symbol attached thereto when the magnification is to be increased).

The target value computed by the CPU 32 is written to the correction control portion 26 as correction data. The correction control portion 26, for example, sets the number of steps of the skew motor 28 using the above formula (1) and corrects the skew in the direction of rotation of the photoreceptor 14 so that the toner images of each of the colors match the target value.

Figure 3:
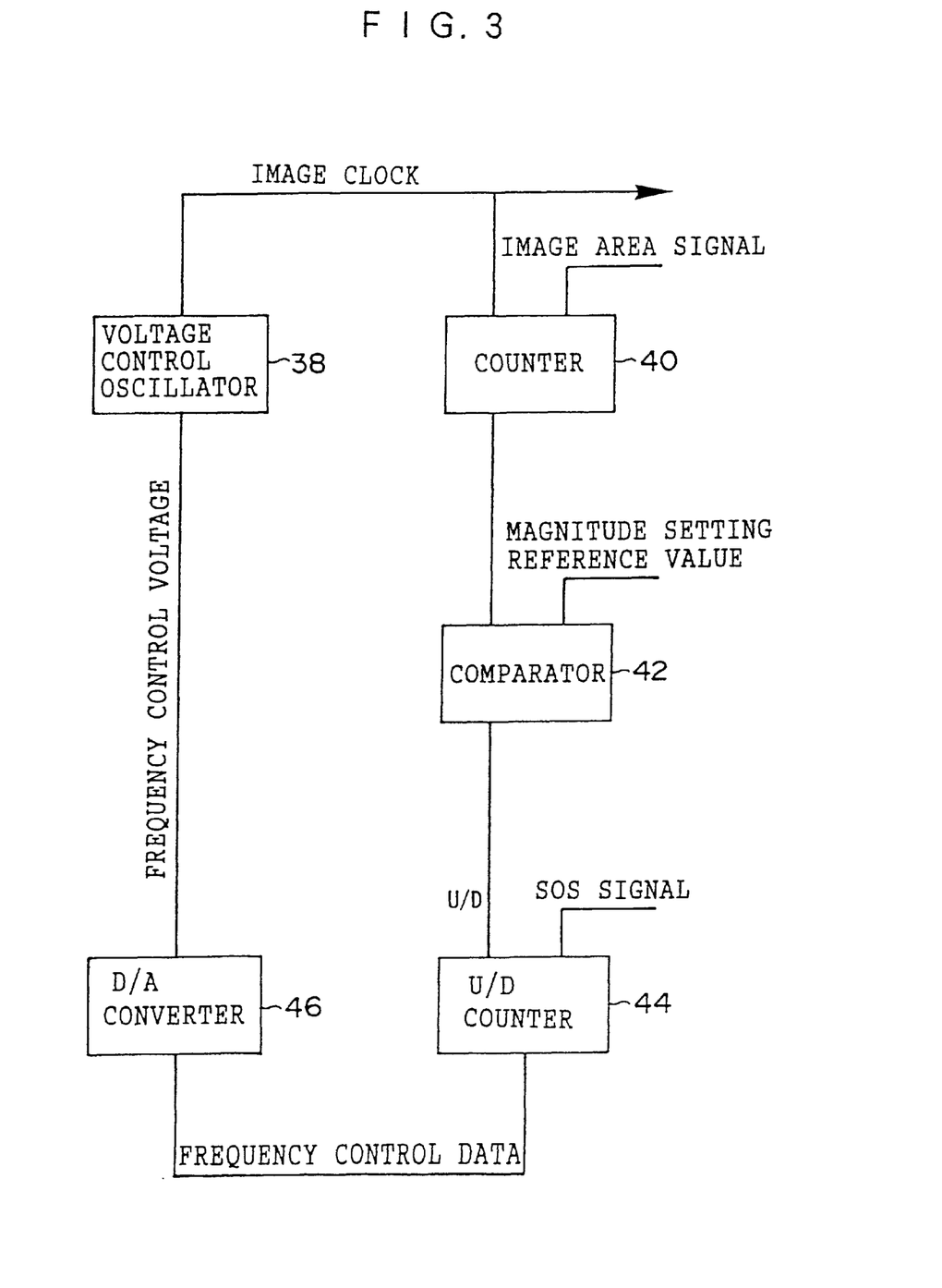
FIG. 3 is a block diagram showing the image clock control circuit.

The image clock control circuit 62 for controlling the timings of the output of the pre-SOS lighting signal and the output of the APC signal are shown in FIG. 3. The image clock control circuit 62 is built into the correction control portion 26.

When a light beam is emitted from the laser diode 100 provided in the photo-scanning device 16 and strikes the SOS sensor 126, the SOS sensor 126 detects the passage of the light beam and outputs an SOS signal. This causes a voltage control oscillator 38 to generate an image clock. The number of image clocks generated by the voltage control oscillator 38 is counted by a counter 40 for the period corresponding to the image area determined by a crystal oscillator or the like (the time of LS signal output).

A comparator 42 compares the count value of the number of image clocks output from the counter 40 with the magnification setting reference value (which corresponds to the aforementioned target value), and generates an up signal if the count value is less than the magnification setting reference value and a down signal if the count value is more than the magnification setting reference value.

A U/D counter 44 executes a count-up or a count-down of, for example, the timings of the output of the pre-SOS lighting signal and the output of the APC signal. The pre-SOS lighting signal is a signal for controlling a light beam emitted from the laser diode 100 immediately before the timing of the output of the SOS signal so that the SOS signal is reliably outputted. The APC signal is a signal for instructing the execution of control of the amount of light of the light beam emitted from the laser diode 100. The result of the count output from the U/D counter 44, is input to a D/A converter 46. The D/A converter 46 converts the input digital value to an analogue voltage and outputs this voltage to a voltage control oscillator 38.

By repeating this closed loop control, the magnification of the toner image in each color in the main scanning direction reaches the magnification setting reference value. The frequency of the image clock is therefore controlled so as to become a predetermined frequency determined by the target value. Accordingly, the timings of the output of the pre-SOS lighting signal and the output of the APC signal become uniform timings determined in advance.

Figure 4:
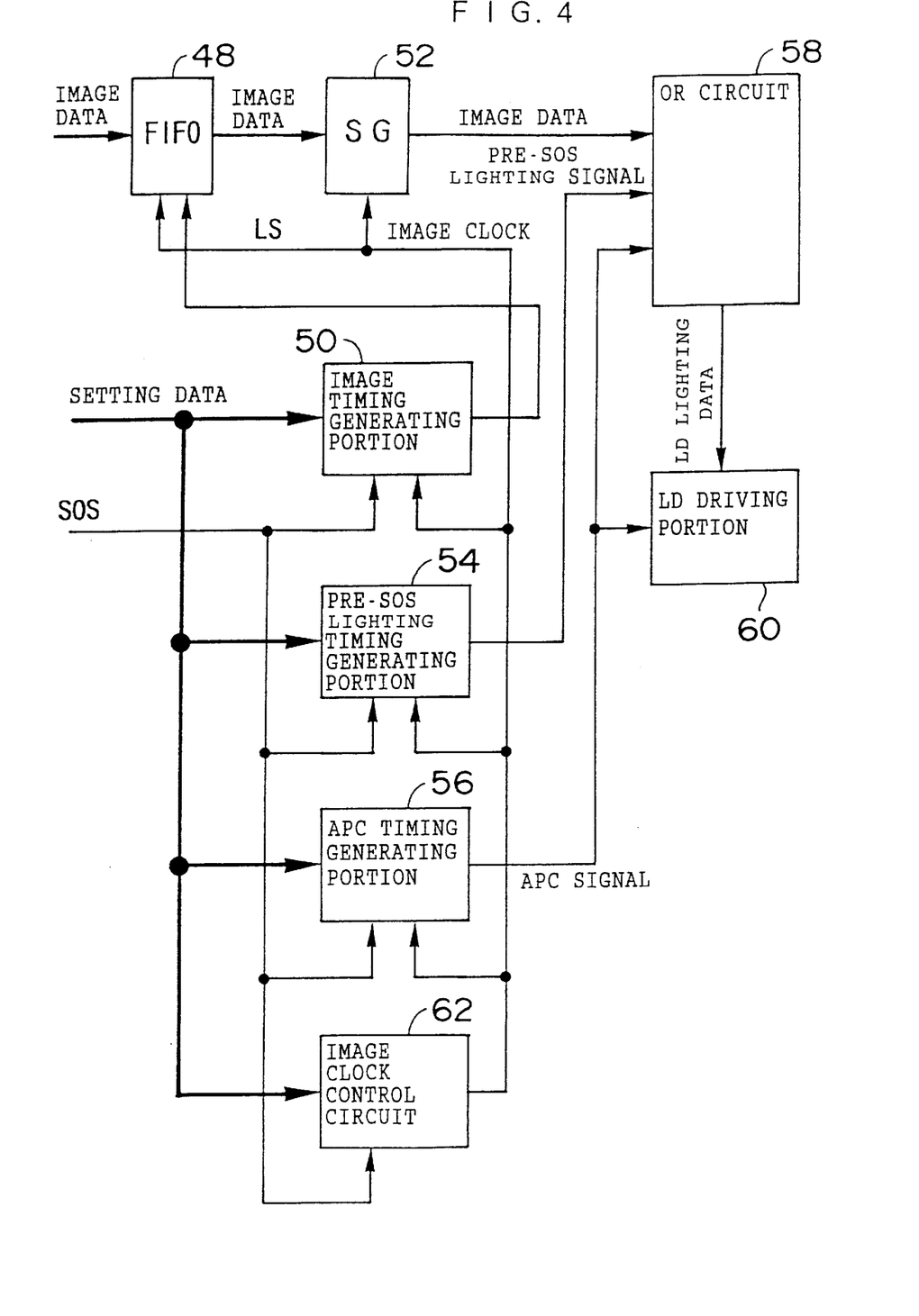
FIG. 4 is a block diagram showing the lighting control portion.

Details of the lighting control portion 64 for controlling the lighting of the laser diode 100 provided in the photo-scanning device 16 are shown in FIG. 4.

Image data output from an unillustrated image processing portion is temporarily stored in an FIFO 48 in order to control the output timings. The image timing generating portion 50 outputs an LS signal to the FIFO 48 (the LS signal is a signal which permits reading in accordance with the position of the image in the main scanning direction set by the unillustrated CPU). Accordingly, when the LS signal has been inputted, the FIFO 48 outputs the image data to a screen generator 52. In the SG 52, the multi-bit image data is converted to a modulating signal adapted to suit the characteristic of the laser diode 100.

The pre-SOS lighting generating portion 54 counts the number of inputs of the image clock from the time the SOS signal was input, and generates a pre-SOS lighting signal when the count value matches the pre-SOS lighting timing data set by the CPU. In the same way, the APC timing generating portion 56 counts the number of inputs of the image clock from the time the SOS signal was input, and generates an APC signal for executing control of the amount of light of the light beam when the count value matches the APC timing data set by the CPU. The image data, the pre-SOS lighting signal, and the APC signal are output to an OR circuit 58. The OR circuit 58 outputs LD lighting data to an LD driving portion 60 when any of the image data, the pre-SOS lighting signal, or the APC signal are inputted. In other words, when image data is input, the laser diode 100 is turned on in order to scan the image onto the photoreceptor 14. When the pre-SOS lighting signal is input, the laser diode is forcibly lit directly before the output timing of the SOS signal. When an APS signal is input, the laser diode 100 is forcibly lit to execute control of the amount of light of the laser beam.

Next, the operation of the present embodiment will be explained with reference to FIGS. 5 through 7.

Figure 5:
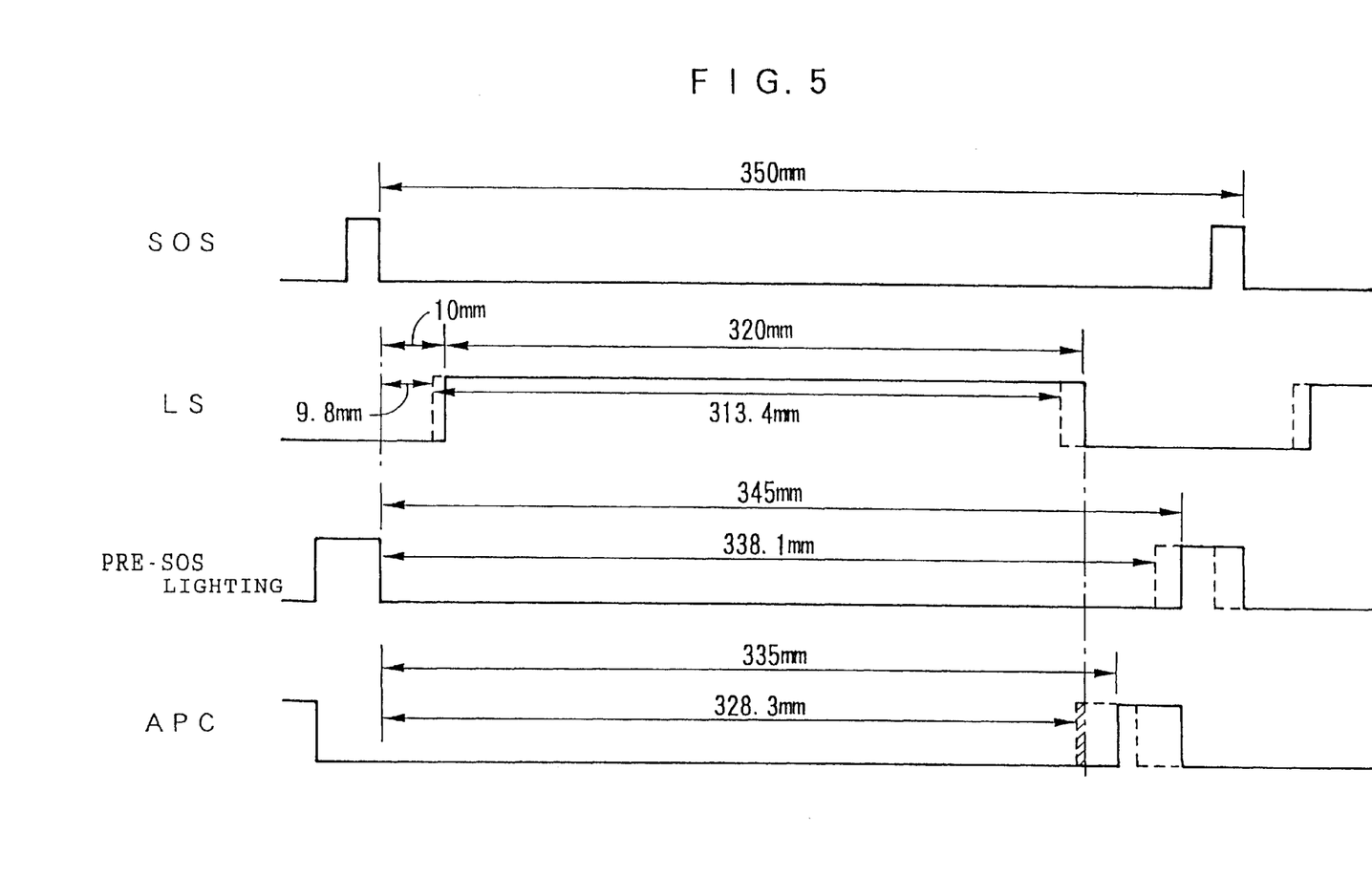
FIG. 5 is a timing chart showing the timings of the output of the respective signals in a nominal state.

Firstly, as is shown in FIG. 5, the timings of the output of the SOS signal, of the output of the LS signal, of the output of the pre-SOS lighting signal, and of the output of the APC signal of a toner image without the magnification thereof in the main scanning direction being altered (nominal state), namely, the timings (distance) of the output of each signal, with the points in time when the SOS signal was output taken as references, and the image clock number are set as is shown in Table 1 below. Note that the image clock number in the Start of APC column equates to the aforementioned APC timing data, and the image clock number in the Start of pre-SOS lighting column equates to the aforementioned pre-SOS lighting timing data.

TABLE 1

|  | Start of image area | End of image area | Start of APC | Start of pre-SOS lighting | SOS |
|---|---|---|---|---|---|
| Distance (mm) | 10 | 330 | 335 | 345 | 350 |
| Image clock number | 236 | 7795 | 7913 | 8149 | 8267.7 |

If the frequency of the image clock is increased by, for example, 2% in order to reduce the magnification of the image in the main scanning direction, the timings of the output of each signal are set as is shown in Table 2 below when the conventional method is used. Note that the timings of the output of each signal are set on the basis of the following Formula (2).
Formula 2.

$$\text{Timing after alteration} = \text{timing before alteration} \times (100 - \text{the magnification to be changed})/100 \qquad (2)$$

For example, the timing of the start of the output of the LS signal is obtained using the following Formula (3).
Formula 3.

$$10 \times 100 - 2/100 = 9.8 \qquad (3)$$

TABLE 2

|  | Start of image area | End of image area | Start of APC | Start of pre-SOS lighting | SOS |
|---|---|---|---|---|---|
| Distance (mm) | 9.8 | 323.8 | 328.3 | 338.1 | 350 |
| Image clock number | 236 | 7795 | 7913 | 8149 | 8267.7 |

When, therefore, the frequency of the image clock is increased by 2%, the range of 328.3~330 mm (the portion indicated by the diagonal lines in FIG. 5), which is the timing at which the LS signal is output in the nominal state, becomes the timing at which the APC signal is output. Namely, it becomes the timing of the forced lighting of the laser diode 100 for executing control of the amount of light at the time of the output of the LS signal. In the range corresponding to the LS signal in the nominal state, it is not possible to screen out stray light from the forced lighting of the laser diode 100, therefore, turbidity due to the stray light appears in the image formed on the paper 22. Accordingly, on the basis of the above Formula (2), the timing at which the output of the pre-SOS lighting signal is started, the timing at which the output of the APC signal is started, and the timing at which the output of the APC signal is ended are controlled.

Here, as the magnification to be changed is 2%, the timings of the output of each signal, including the timing of the start of the output of the pre-SOS lighting signal, the timing of the start of the output of the APC signal, and the timing of the end of the output of the APC signal, are set as is shown in Table 3.

Namely, in the present embodiment, the timing of the outputs of the APC signal and the pre-SOS lighting signal are controlled on the basis of the size of the change in the magnification of the image in the main scanning direction (2% in the above example). Note that not only the size of the change in the magnification of the image in the main scanning direction may be used, but also the magnification of the image immediately before and after the change in the main scanning direction may be used.

In addition, in the present embodiment, the APC timing data (the image clock number in the Start of APC column) and the pre-SOS lighting timing data (the image clock number in the Start of pre-SOS lighting column) are altered so that the timings of the outputs of the APC signal and the pre-SOS lighting signal are changed in reverse by the same amount which they changed in accordance with the changes in the frequency of the image clock.

For example, the timing of the output of the pre-SOS lighting signal is obtained on the basis of Formula (4) shown below.
Formula 4.

$$338.1 \times (100 - (-2))/100 = 344.9 \qquad (4)$$

Further, if, for example, the APC timing data before alteration is taken as APCTD 0, and the APC timing data after alteration is taken as APCTD 1, and the magnifications of the image in the main scanning direction before and after alteration are taken as M0 and M1 respectively, then APCTD 1 is obtained on the basis of Formula (5) shown below. The pre-SOS lighting timing data (the image clock number in the Start of pre-SOS lighting column) is obtained in the same fashion.
Formula 5.

$$APCTD1 = (M0/M1)APCTD0 \qquad (5)$$

TABLE 3

|  | Start of image area | End of image area | Start of APC | Start of pre-SOS lighting | SOS |
|---|---|---|---|---|---|
| Distance (mm) | 9.8 | 323.4 | 334.9 | 344.9 | 350 |
| Image clock number | 240 | 7950 | 8071 | 8311 | 8267.7 |

Figure 6:
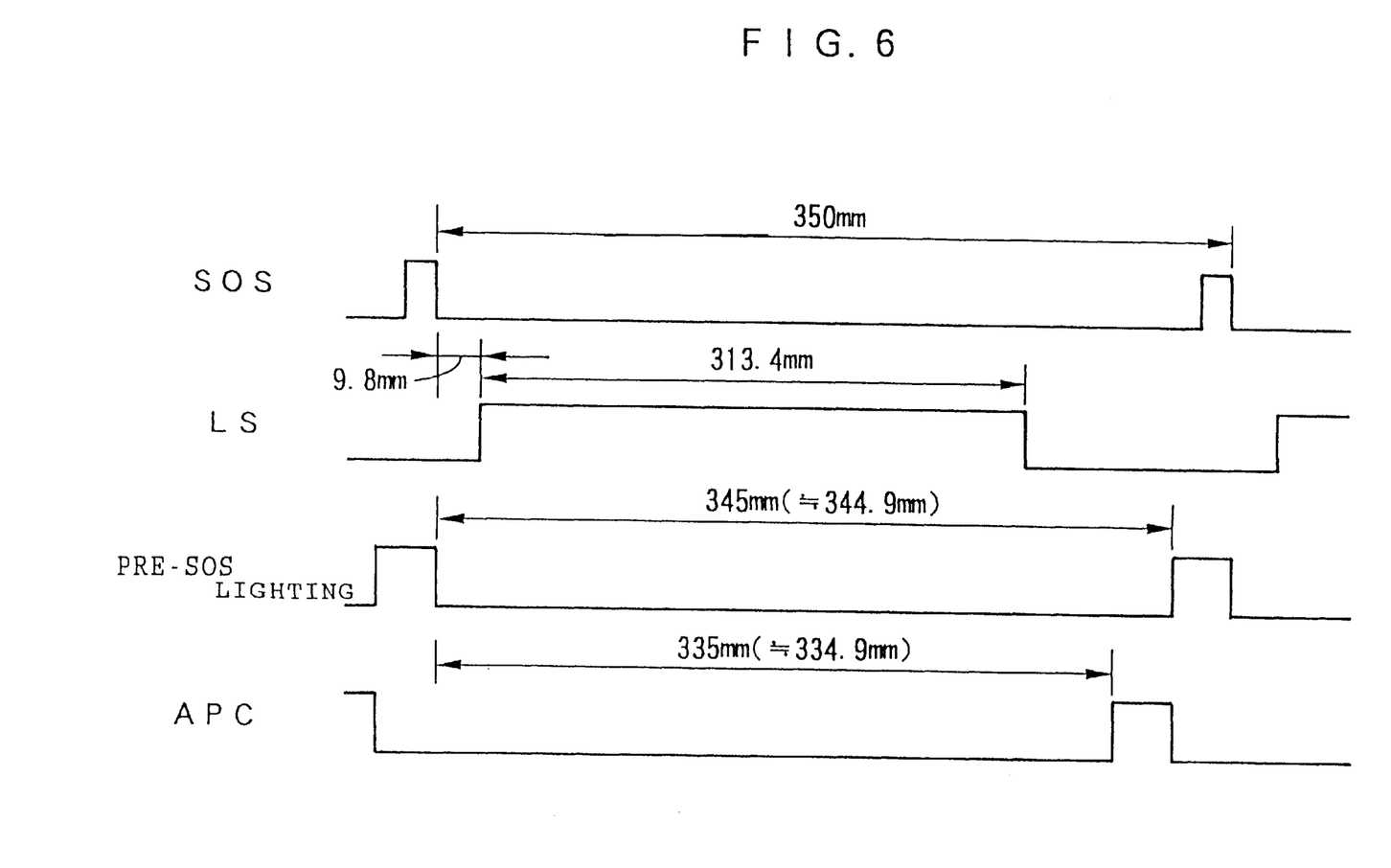
FIG. 6 is a timing chart showing the timings of the output of the respective signals when the magnification of the image in the main scanning direction is set low and the timings of the output of both the pre-SOS lighting signal and the APC signal have been corrected.
Figure 7:
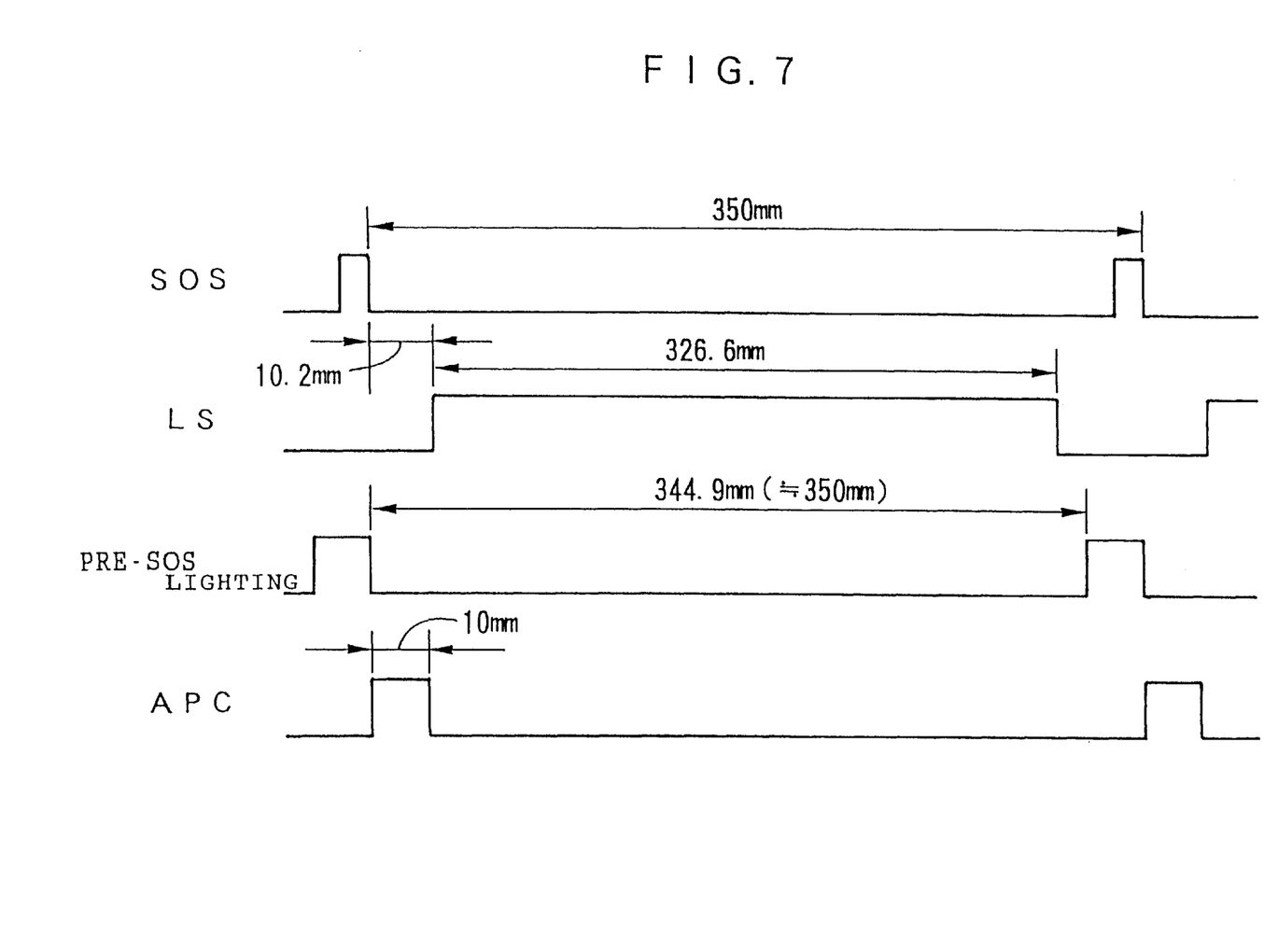
FIG. 7 is a timing chart showing the timings of the output of the respective signals when the magnification of the image in the main scanning direction is set high and the timings of the output of both the pre-SOS lighting signal and the APC signal have been corrected.

According to this, as is shown in FIG. 6, even when the frequency of the image clock is made variable in order to alter the magnification of the toner image in the main scanning direction, it can be seen that the timings of the output of the pre-SOS lighting signal and the output of the APC signal do not change. Namely, the timings of the outputs of the pre-SOS lighting signal and the APC signal are almost identical to the timings of the outputs shown in the aforementioned Table 1.

Accordingly, even when the frequency of the image clock is made variable in order to alter the magnification of the toner image in the main scanning direction, the timings of the outputs of the pre-SOS lighting signal and the APC signal (the period from the input of the SOS signal until the output of the SOS signal) can normally be kept uniform. Accordingly, control of the amount of light of the light beam emitted from the laser diode 100 can be accurately executed and the generation of turbidity in images due to stray light can be prevented. Further, because control of the amount of light of the light beam is being accurately carried out, there is no reduction in the amount of light of the light beam, thereby ensuring that the light beam can be accurately detected by the SOS sensor 26. As a result, the SOS signal is accurately output in a predetermined cycle.

The photo-scanning device according to the present embodiment is of the aforementioned overfield type. As was described above, a sufficient efficient scanning ratio can be obtained using the overfield type of photo-scanning device, however, the period from the end of the output of the image signal until the next SOS signal is output is shorter than in an underfield type of device. Therefore, when the magnification of the image in the main scanning direction is increased, the period from the end of the output of the image signal until the next image signal is output is reduced even further. Accordingly, there is the fear that problems, such as the control of the amount of light of the light beam being inaccurate, will occur. However, in the present embodiment, the timings of the outputs of the pre-SOS lighting signal and the APC signal (the period from the input of the SOS signal to the output of the SOS signal) can normally be kept uniform. Therefore, not only can the control of the amount of light of the light beam be accurately executed, but the generating of turbidity in the image due to stray light can be prevented. This is particularly significant in the case of an overfield type of photo-scanning device. In other words, a sufficiently large efficient scanning ratio can be obtained, accurate control of the amount of light of the light beam can be executed, and the generating of turbidity in images due to stray light can be prevented.

In contrast, if the frequency of the image clock is reduced 2% in order to increase the magnification of the toner image in the main scanning direction, then, if the conventional method is employed, the settings shown in the following Table 4 are made.

TABLE 4

|  | Start of image area | End of image area | Start of APC | Start of pre-SOS lighting | SOS |
|---|---|---|---|---|---|
| Distance (mm) | 10.2 | 336.6 | 341.7 | 351.9 | 350 |
| Image clock number | 236 | 7795 | 7913 | 8149 | 8267.7 |

According to this, the timing of the output of the next SOS signal starts during the execution of the control of the amount of light caused by the output of the APC signal. Because of this, the control of the amount of light of the light beam emitted from the laser diode 100 may become inaccurate, or in some cases, when the amount of light of the light beam is reduced, the detection of the light beam by the SOS sensor is not performed accurately and the SOS signal may not be outputted. At that time, if the timing of the end of the output of the LS signal exceeds the timing of the start of the output of the APC signal in the nominal state, or the timing of the end of the output of the LS signal occurs in the vicinity of before the timing of the start of the output of the APC signal in the nominal state, then, as is shown in FIG. 7, the timing of the start of the output of the APC signal is altered directly after the output of the SOS signal. Note that the timing of the start of the output of the pre-SOS lighting signal is computed on the basis of formula (2) as mentioned above. This ensures that the pre-SOS lighting signal is output at a normally uniform timing and that the detection of the light beam by the SOS sensor 126 is accurately per formed. The timings of the output of each signal in this case are set as is shown in Table 5 below.

TABLE 5

|  | Start of image area | End of image area | Start of APC | End of APC | Start of pre-SOS lighting | SOS |
|---|---|---|---|---|---|---|
| Distance (mm) | 10.2 | 336.6 | 0 | 0 | 344.9 | 350 |
| Image clock number | 236 | 7795 | 0 | 231 | 7986 | 8267.7 |

Accordingly, even when the frequency of the image clock is made variable in order to alter the magnification of the toner image in the main scanning direction, the time necessary for executing control of the amount of light of the light beam can be sufficiently secured. This ensures that accurate control of the amount of light can be executed.

Note that, signals such as the APC signal, for example, which are time dividable may be controlled so as to be divided and output directly before and directly after the output of the SOS signal. Namely, it is sufficient if the total time of the output of the APC signal is constant. After the timing of the start of the output of the APC signal has been altered to be directly after the output of the SOS signal, as described above, when the timing of the end of the output of the LS signal is sufficiently earlier than the timing of the start of the output of the APC signal in the nominal state, the timing of the start of the output of the APC signal is returned to the initial timing.

Further, in the present embodiment, the description given was for when the correction target value was computed by the CPU on the basis of the image position information for each colored image computed by the image position computing portion, however, the present invention is not limited to this. For example, a correction target value may be determined in advance in accordance with the frequency of the image clock for altering the magnification of the toner image in the main scanning direction, and a correction target value corresponding to this may be selected and used.

In addition, in the aforementioned embodiment, the APC signal and the pre-SOS lighting signal are output on the basis of the image clock input count number from the time the SOS signal is input, however, the present invention is not limited to this and the APC signal and the pre-SOS lighting signal may be output on the basis of the image signal input count number output synchronously (or in fractions of the frequency of the image clock) with the image clock.

What is claimed is:

1. An image forming device capable of altering a magnification of an image in a main scanning direction by making a frequency of an image clock variable, comprising:

a first output means which outputs a lighting instructing signal for instructing that a light beam emitted from a light source be turned on, on the basis of main scanning signals output from a scan sensor for each main scanning;

a second output means for outputting a light amount control instructing signal for instructing that control of an amount of light of the light beam be executed, on the basis of the main scanning signals output for each main scanning;

and a control means for controlling said first output means and said second output means so that periods from the output of said main scanning signals until the outputs of said lighting instructing signal and said light amount control instructing signal become uniform regardless of changes in the frequency of said image clock.

2. An image forming device according to claim 1, wherein said control means controls said first output control means and said second output control means on the basis of a value expressing a change in the magnification of the image in the main scanning direction.

3. An image forming device according to claim 1, wherein said lighting instructing signal and said light amount control instructing signal are output on the basis of the image clock from the time of the output of said main scanning signals or on the basis of an output count value of an image signal output synchronously with the image clock, and said control means alters said output count value so that said output count value changes conversely by the same amounts as the changes in the timings of the outputs of said lighting instructing signal and said light amount control instructing signal which changed in accordance with changes in the frequency of said image clock.

4. An image forming device according to claim 1, comprising further detecting means for detecting prior to main scanning the passage of a light beam emitted from a light source, wherein said control means controls said second output means so that, when the timing of the end of image formation in a main scanning is in the vicinity of the end of the timing of the output of said light amount control instructing signal or the start of the timing of the output of said light amount control instructing signal, said light amount control instructing signal is output directly after the passage of a light beam is detected by said detecting means.

5. An image forming device capable of altering a magnification of an image in a main scanning direction by making a frequency of an image clock variable, comprising:

a first output device which outputs a lighting instructing signal for instructing that a light beam emitted from a light source be turned on, on the basis of main scanning signals output from a scan sensor for each main scanning;

a second output device for outputting a light amount control instructing signal for instructing that control of the amount of light of the light beam be executed, on the basis of the main scanning signals output for each main scanning;

and a control device for controlling said first output device and said second output device so that periods from the output of said main scanning signal until the outputs of said lighting instructing signal and said light amount control instructing signal become uniform regardless of changes in the frequency of said image clock.

6. An image forming device according to claim 5, wherein said control device controls said first output control device and said second output control device on the basis of a value for expressing a change in the magnification of the image in the main scanning direction.

7. An image forming device according to claim 5, wherein said lighting instructing signal and said light amount control instructing signal are output on the basis of the image clock from the time of the output of said main scanning signals or on the basis of an output count value of an image signal output synchronously with the image clock, and said control device alters said output count value so that said output count value changes conversely by the same amounts as the changes in the timings of the outputs of said lighting instructing signal and said light amount control instructing signal which changed in accordance with changes in the frequency of said image clock.

8. An image forming device according to claim 5, comprising a further detecting device for detecting prior to main scanning the passage of a light beam emitted from a light source, wherein said control device controls said second output device so that, when the timing of the end of image formation in a single main scanning is in the vicinity of the end of the timing of the output of said light amount control instructing signal or the start of the timing of the output of said light amount control instructing signal, said light amount control instructing signal is output directly after the passage of a light beam is detected by said detecting device.

* * * * *